Sept. 30, 1969　　　　B. G. FORSYTHE　　　　3,469,658
SELF-ALIGNING, CALIPER TYPE BRAKE
Filed Jan. 29, 1968　　　　　　　　　　　　　　4 Sheets-Sheet 1

BOBBIE G. FORSYTHE
INVENTOR

BY
Wayland D. Keith
HIS AGENT

Sept. 30, 1969  B. G. FORSYTHE  3,469,658

SELF-ALIGNING, CALIPER TYPE BRAKE

Filed Jan. 29, 1968  4 Sheets-Sheet 4

BOBBIE G. FORSYTHE
*INVENTOR.*

BY
Wayland D. Keith
HIS AGENT

United States Patent Office 3,469,658
Patented Sept. 30, 1969

3,469,658
SELF-ALIGNING, CALIPER TYPE BRAKE
Bobbie G. Forsythe, Iowa Park, Tex., assignor to Wichita Clutch Company, Inc., Wichita Falls, Tex.
Filed Jan. 29, 1968, Ser. No. 701,176
Int. Cl. F16d 55/224, 69/04
U.S. Cl. 188—73                                9 Claims

ABSTRACT OF THE DISCLOSURE

A brake which may be installed onto a shaft intermediate the bearings on which the shaft is mounted, without having to remove the shaft from the bearings. The brake is so designed that the pressure to a disc is applied by one or more caliper elements, each of which caliper elements has two pucks or friction elements therein which are non-rotatable, but yieldable so as to be self-aligning with respect to the disc, which disc is also longitudinally movable on the shaft to permit further alignment so that the pucks will wear evenly, and without distortion or binding. Each caliper element utilizes a pancake type tube therein to which air is supplied for pneumatic actuation of the braking elements. The disc and all of the elements installed around the shaft are split to enable installation onto the shaft and removal therefrom, without removing the shaft from the bearing mounts, thereby enabling disassembly and replacement of parts.

---

This invention relates to improvements in brakes and more particularly to caliper brakes used with a disc member, the components of which brake may be assembled onto a shaft while the shaft is in place, or the brake may be disassembled from the shaft for repair or replacement of parts, without having to remove the shaft from bearings or the like.

Various caliper brakes have been proposed heretofore, but these, insofar as known, require that the shaft be removed from bearing mounts in order to install the brake, or the brake was moved into place over the end of the shaft, which, in most instances, was very undesirable, expensive, and almost impossible to accomplish, under certain conditions.

With the present brake, the components may be readily assembled onto the shaft while the shaft is in place, and the other parts associated therewith mounted around the shaft to cooperate with the brake components to enable repair or replacement of parts, with a minimum of shutdown time. This is very desirable, particularly where the machinery is being used to perform critical operations, such as on the propeller shaft of a ship, or on machinery wherein the brake is mounted on the shaft intermediate two bearings.

An object of this invention is to provide a disc type brake which may be readily installed onto or removed from a shaft between the bearings journaling the shaft, without having to remove the shaft from the bearings.

Another object of the invention is to provide a caliper type disc brake, wherein the friction elements engage the disc brake element, which friction elements are fixed against rotation, but are longitudinally movable to permit self-aligning of the friction elements or pucks with respect to the brake disc.

Still another object of the invention is to provide friction elements or pucks which are engageable by one or more pneumatic pressure actuating elements, which elements are in the form of closed, pancake type tubes.

Yet another object of the invention is to provide a caliper type disc brake which is simple in construction, easy to install onto or to remove from a shaft which is journaled between bearings, and which is low in the cost of manufacture.

With these objects in mind, and others which will become manifest as the description proceeds, reference is to be had to the accompanying drawings, on which like reference characters designate like parts in the several views thereof, in which.

Figure 1:
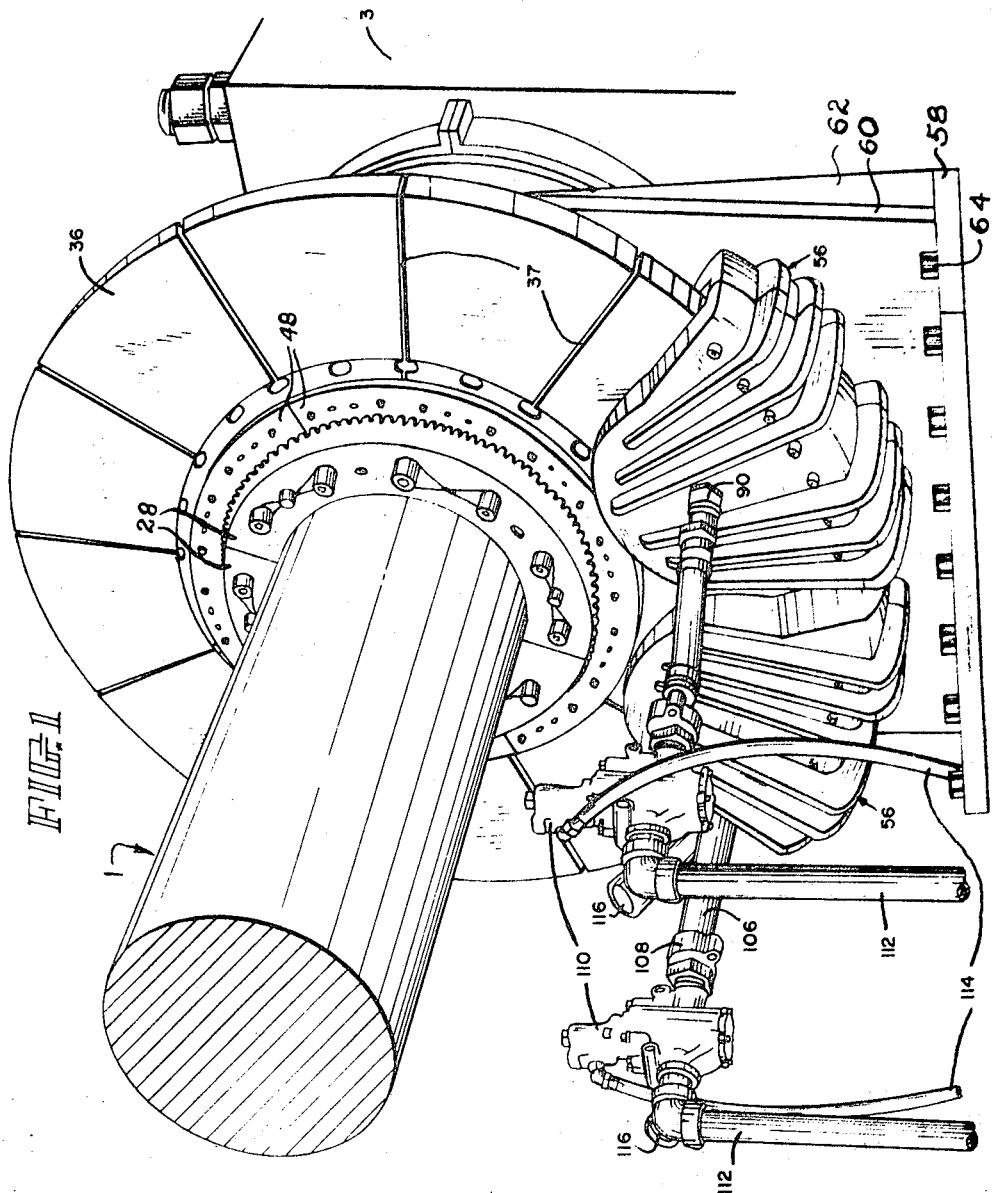
FIG. 1 is a perspective view showing the caliper type disc brake installed on a shaft, and showing a bearing associated with the shaft, the shaft being shown in section, and air actuator lines are shown as leading to the valves to actuate the pneumatic elements of the brake.
Figure 2:
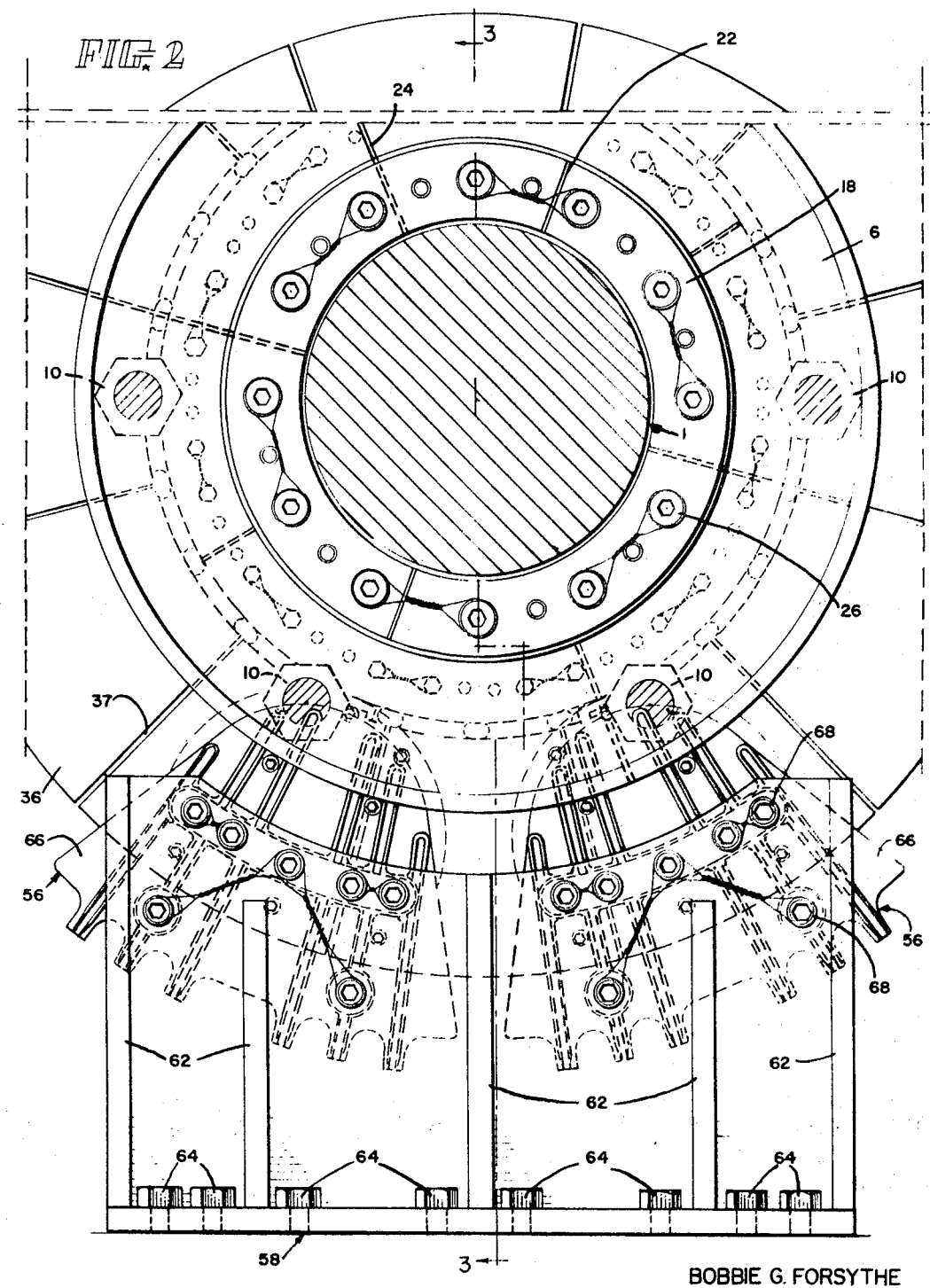
FIG. 2 is a sectional view taken on the line 2—2 of FIG. 3, looking in the direction indicated by the arrows.
Figure 3:
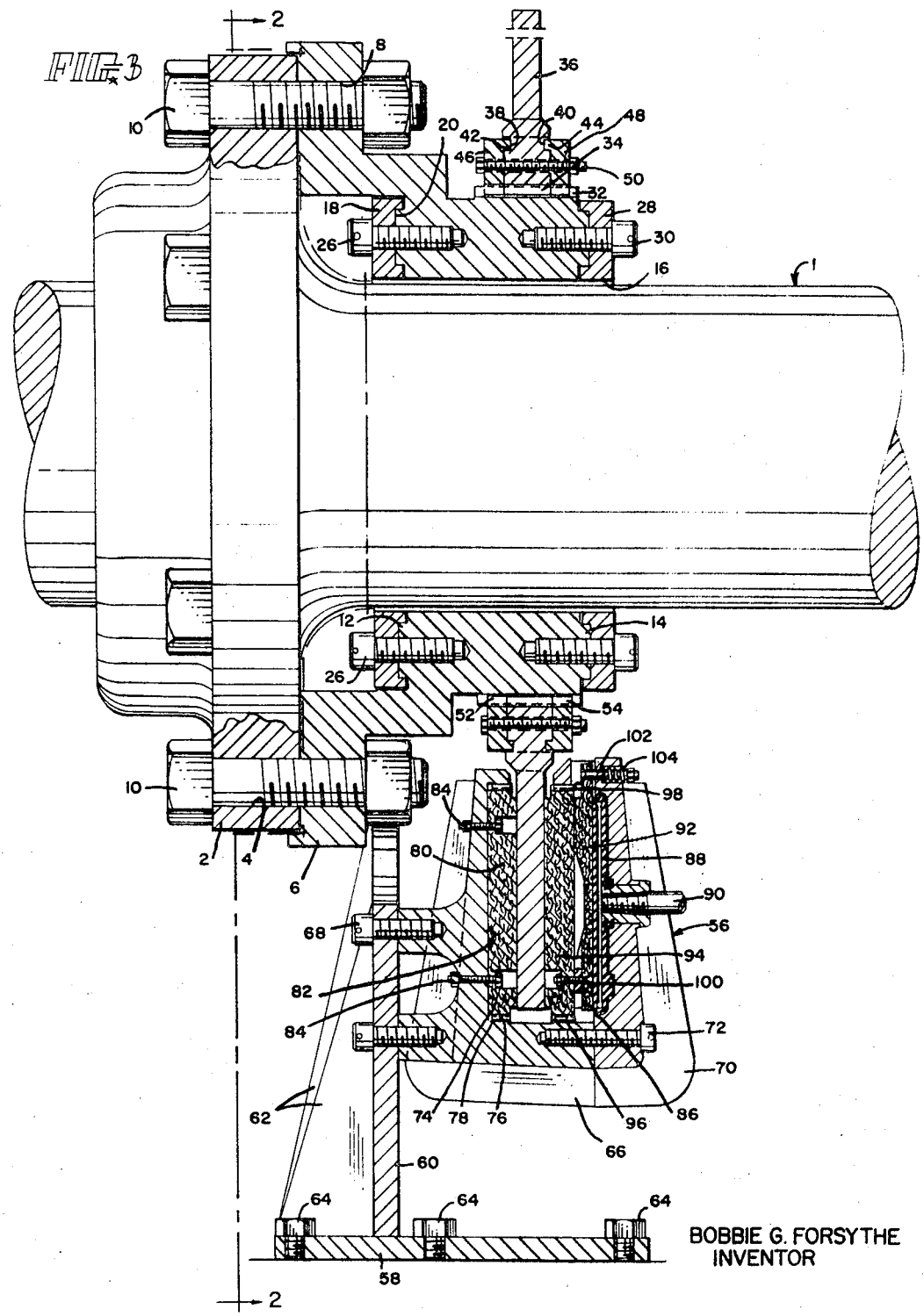
FIG. 3 is a sectional view taken on the line 3—3 of FIG. 2, looking in the direction indicated by the arrows, with parts broken away and with parts shown in elevation, to bring out the details of construction.
Figure 4:
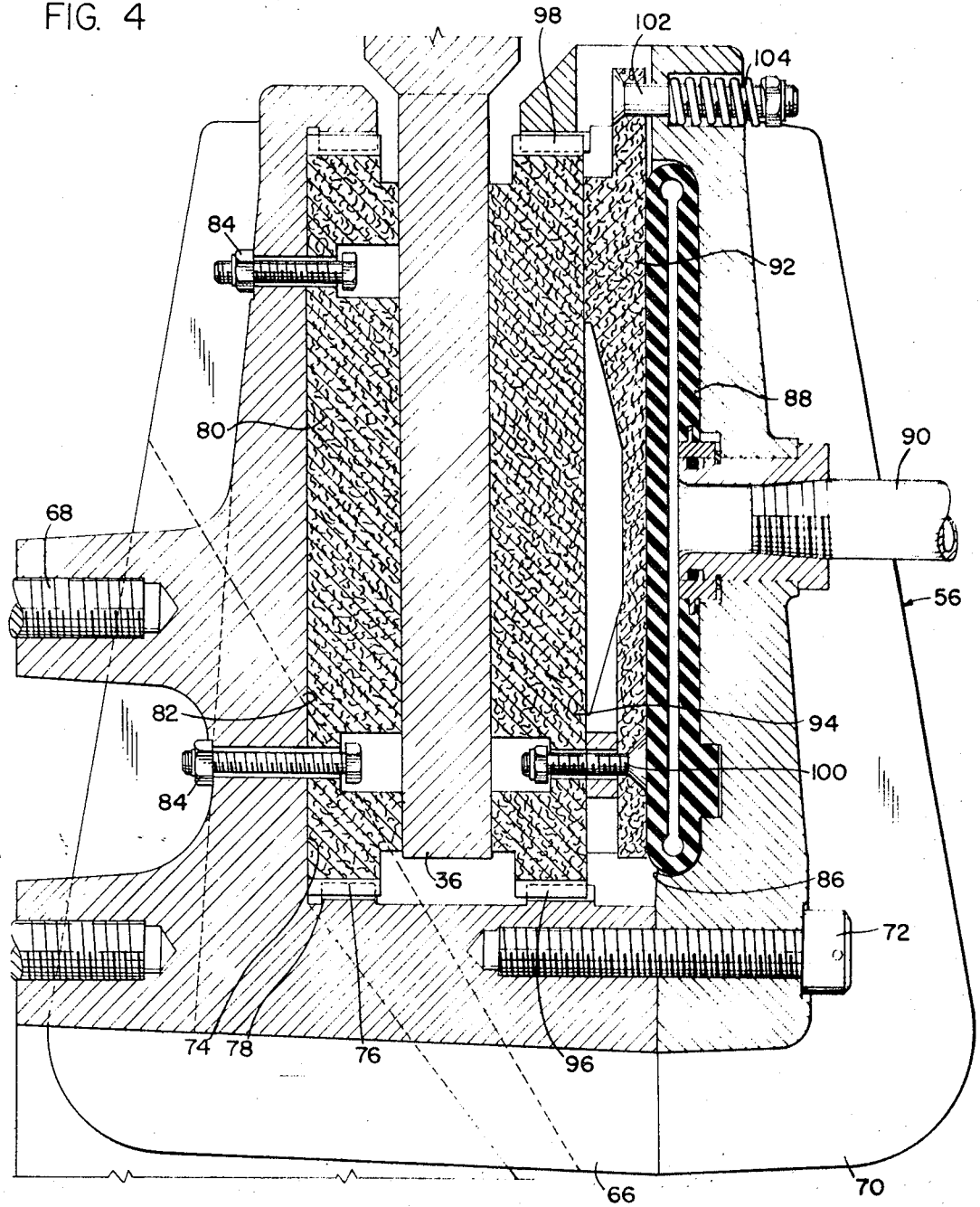
FIG. 4 is a sectional view similar to FIG. 3 and shows further details of the construction.

With more detailed reference to the drawing, the numeral 1 designates generally a shaft, which shaft has a flange 2 thereon, which flange may be made integral therewith or secured thereto. The flange 2 has circumferentially spaced bolt holes 4 formed around the periphery thereof to enable the attachment of a split disc brake mounting hub 6, which has bolt holes 8 formed therein, which bolt holes 8 are adapted to register with holes 4 in flange 2, so bolts 10 may pass therethrough to bindingly engage the disc brake mounting hub 6 to the flange 2.

The disc brake mounting hub 6 has annular bosses 12 and 14 formed therearound to surround the bore 16 thereof adjacent thereto. A pair of semiannular rings 18 each has a groove 20 formed therein, which will engage the annular boss 12, so as to hold the brake mounting hub 6 against lateral movement, when semiannular rings 18 are fitted thereon and when the split 22 thereof is out of register with the split 24 in disc brake mounting hub 6, which will prevent lateral movement of the hub 6, when secured in place by bolts 26, which bolts pass through apertures in semiannular ring portions 18, when the portions of the ring are fitted in complementary relation with boss 12 on hub 6, so the apertures in the ring will register with screw threaded holes in the disc brake mounting hub 6.

A split ring 28, which has a groove 29 formed therein, is made up of semiannular portions, which portions are identical in construction to the semiannular ring portions 18. The composite annular ring 28 is in opposed relation to the composite annular ring 18, which portions have apertures formed therein to register with screw threaded holes in disc brake mounting hub 6, so bolts 30 will pass therethrough and threadably engage screw threaded holes within the disc brake mounting hub 6. The split formed between the semiannular portions of ring 28 is positioned out of register with the split 24 in hub 6, so when the rings 18 and 28 are bolted in place, the rings will hold the brake disc in rigid relation. The groove 29 fits on annular boss 14 in complementary relation to retain the split hub portions 6 in fixed relation. The hub 6 has teeth or splines 32 thereon, around the periphery thereof, to register with teeth 34 within the disc 36 of the brake. The brake disc 36 has annular grooves 38 and 40 therearound to receive annular bosses 42 and 44 respectively therein. The bosses 42 and 44 are formed on a pair of semiannular ring portions 46 and a pair of semiannular ring portions 48 respectively, which semiannular rings form rings which are held in binding engagement with the brake disc 36 by bolts 50.

The brake disc 36 is also split, and when bolted together by semiannular split rings 46 and 48, forms a unitary composite member. The brake disc 36 has teeth 34 thereon and semiannular rings 46 and 48 have teeth 52 and 54, respectively thereon, the teeth of which rings are complementary with the teeth 34 of the brake disc 36, which enables free sliding movement of the brake disc 36 and the rings formed of semiannular portions 46 and 48 on hub 6.

The caliper braking mechanism is designated generally by the numeral 56, which includes a base 58 and an upstanding member 60, which base has braces 62 secured thereto and to the upstanding member 60. The base 58 is bolted in place by bolts 64, which maintains the upstanding member in rigid relation with respect thereto and with respect to rotatable brake disc 36. A caliper brake body is composed of an inner section 66 which is bolted to upstanding member 60 by bolts 68, which bolts pass through apertures in the upstanding member 60 and into screw threaded holes in inner section 66 of the caliper brake mechanism. A second caliper member 70 is secured to the first caliper section 66 by bolts 72, so that the caliper members will form a bifurcated body on each side of the brake disc 36.

The inner caliper section 66 has a recess 74 formed on one side thereof, which recess is round and has internal teeth or splines 76 therein, which teeth 76 complementally receive the teeth 78 of friction element or puck 80. The plane surface of the recess, which receives the puck 80, forms a back plate 82. A plurality of bolts 84 has the heads thereof recessed within the friction element and pass through the back plate 82, which bolts 84 are of lesser diameter than the holes through back plate 82 and the nuts thereon do not draw the puck 80 into binding engagement with the back plate 82, thereby lateral shifting of the puck 80 is permitted, so that the teeth 76 and 78 will properly engage so as to give the maximum amount of frictional engagement to the face of brake disc 36.

The caliper member 70 has a recess 86 formed therein to complementally receive a pancake type, closed, elastomer, axially expansible tube 88, which tube 88 has an air conduit 90 connected therewith, so, upon inflation of the tube 88, a pressure plate 92, which is preferably of asbestos or other low heat conductivity material, is positioned intermediate the tube 88 and the friction element or puck 94, so, upon expansion of tube 88, the friction element or puck 94 will be moved into engagement with friction brake disc 36. The caliper member 70 is recessed, which recess has teeth 96 around the periphery thereof which complementally receive teeth 98 positioned around the periphery of puck 94, so that the puck 94 will be maintained against rotation. Bolts 100 pass through puck 94 and loosely secure the back plate 92, which is the pressure plate, thereto, so as to permit limited lateral movement, so that the teeth 96 and 98 are properly meshed. The pressure plate 92 preferably has bolts 102 passing therethrough and through a portion of caliper member 70. A spring 104 surrounds each of the bolts 102 to move the puck 94 and pressure plate 92 against tube 88 so as to expel the air therefrom and to move the friction element or puck 94 out of engagement with brake disc 36. The brake disc 36 is mounted on teeth 32 for free sliding movement, when the brake is disengaged. In this manner, the pucks 82 and 94 may be properly engaged, upon application of air to axially expansible, elastomer tube 88.

The loose connection between friction element 80 and its associated backing member 82 as provided by the fastening means 84 as well as the loose connection between friction element 94 and its associated backing member in the form of pressure plate 92 as provided by fastening means 100 permits the opposed friction elements limited transverse and axial movement of the friction elements with respect to the backing member to which it is attached whereby the friction elements are adapted to angularly align with the frictional surface of the brake disc.

It is apparent that the fastening means provides a limited amount of relative movement between the friction elements and the brake disc so that the friction elements will be held out of engagement with the brake disc when the brake is in release position.

The present brake is shown to have two caliper brake elements 56 thereon so as to give a greater braking area to brake disc 36. However, one or more brake units may be used in accordance with the requirements.

The conduit 90 of each of the brake elements connects through hose 106 to a disconnect coupling 108 to enable the component parts of the caliper brake mechanism to be readily disassembled and reassembled. An actuating valve is provided for each caliper braking mechanism 56, which permits the air from air supply line 112 to be selectively directed into the hose 106, to conduit 90 and to axially expansible, elastomer tube 88. An actuator control hose 114 leads to each of the valves 110 so as to selectively direct air into the brake and to selectively direct air therefrom. Each valve 110 is provided with a relief port 116 to release air from the elastomer tube 88.

The present brake is so designed that it may be readily installed on a shaft, under the most adverse conditions, either where a flange already exists on the shaft between two bearings or on a conventional split flange which may be mounted on a shaft, as by welding or bolting and a brake put on the shaft in the field or on a ship, and also worn parts may be readily removed and replaced in a minimum of time and with a minimum to shut down time for the machinery. Furthermore, the caliper brake mechanisms 56 may be used in one, two or more units on a brake disc, with the disc being radially slitted, as indicated at 37, which provides for circulation of air therethrough and prevents distortion of the brake disc when it becomes heated. The brake disc may be made of any desired metal to provide the proper coefficient of friction to enable braking.

While only one bearing 3 has been shown, it is to be understood that the brake disc 36 may be readily mounted between two bearings.

Having thus clearly shown and described the invention, what is claimed as new and desired to be secured by Letters Patent is:

1. A caliper type brake for use on a shaft, which brake comprises a hub, a brake disc mounted on said hub, a base, a bifurcated body associated with said base, said bifurcated body having a recess formed therein on each inner side thereof, a friction element complementally fitted in each recess, said friction elements being secured against rotation with respect to said body and being axially movable with respect thereto for engaging opposed faces of said brake disc when in one position and to release said brake disc when in another position, a pressure plate positioned on the outer side of one of said friction elements, fastening means for fastening one of said friction elements to a portion of said body, additional fastening means for fastening the other of said friction elements to said pressure plate, said fastening means permitting limited transverse and axial movement of each of said friction elements with respect to the member to which it is fastened so that the friction elements are adapted to be angularly aligned with the frictional surface of said brake disc when in one position, resilient means biased between said body and said pressure plate to move said pressure plate and the friction member fastened thereto out of engagement with said brake disc when in one position, a pressure responsive element mounted between said pressure plate and said caliper body to move said pressure plate and the friction element fastened thereto into engagement with said brake disc, and means for operating said pressure responsive element.

2. A caliper type brake as defined in claim 1 wherein said pressure responsive element comprises an axially expansible tube, said means for operating said element comprising an air supply conduit for supplying air pressure to said tube.

3. A caliper type brake as defined in claim 1 wherein said body has teeth formed around each of said recesses, each of said friction elements having teeth formed around the periphery thereof engageable with said first mentioned teeth.

4. A caliper type brake as defined in claim 1 wherein said bifurcated body is made of two portions, said body portions being joined at intermediate portions thereof by bolts.

5. A caliper type brake as defined in claim 1 wherein said hub has teeth formed on the periphery thereof, said brake disc having teeth formed in the bore therethrough to complementally engage the teeth on said hub, and said brake disc being movable longitudinally on said hub.

6. A caliper type brake as defined in claim 1 wherein said brake disc has circumferentially spaced radial slits formed therein, said slits forming spaced apart disc segments for engagement by said friction elements to allow circulation of air therethrough and for dissipation of heat therefrom without distortion thereof.

7. A caliper type brake for use on a shaft, which brake comprises a hub, a brake disc mounted on said hub, a base, a bifurcated body associated with said base, said bifurcated body having a recess formed therein on each inner side thereof, a friction element complementally fitted in each recess in non-rotatable relation with respect thereto and being adapted to engage opposed faces of said brake disc when in one position and to release said brake disc when in another position, a pressure plate positioned on the outer side of one of said friction elements, fastening means interconnecting one of said friction elements and said pressure plate, said pressure plate being secured against rotation and being movable parallel with the axis of said disc, resilient means biased between said caliper body and said pressure plate to move said pressure plate and said one friction member interconnected therewith out of engagement with said brake disc when in one position, a pressure responsive element mounted between said pressure plate and said caliper body to move said pressure plate and said one friction element interconnected therewith into engagement with said brake disc upon application of air pressure to said pressure responsive element, an air supply conduit connected with said pressure responsive element, said hub being formed of two pieces, with the juncture of said pieces being 180 degrees apart and lying generally in a plane which passes approximately through the axis of the shaft when fitted thereon, fastening means securing said hub pieces together, said brake disc being mounted on said hub for limited longitudinal movement and for rotation therewith, which brake disc is formed of two pieces, with the juncture of said pieces being approximately 180 degrees apart which juncture lies generally in a plane which passes approximately through the axis of said hub, and fastening means securing said brake disc pieces together.

8. A caliper type brake as defined in claim 7 wherein said fastening means which secures said hub pieces together including two pairs of semiannular ring portions adapted to be fitted on said hub, said rings and said hub having annular, complementary, interengaging bosses and grooves formed thereon to prevent relative lateral movement between said hub portions and said semiannular ring portions, when said ring portions are in one position on said hub pieces, said hub having circumferentially spaced, screw threaded holes formed therein, said semiannular rings having apertures formed therein, which apertures are adapted to register with said circumferentially spaced, screw threaded holes in said hub, and screw threaded bolts adapted to pass through the apertures in said semiannular rings and into said screw threaded holes in said hub to detachably secure said hub pieces together.

9. A caliper type brake as defined in claim 7 wherein said fastening means which secures said brake disc pieces together include two semiannular ring portions adapted to be fitted on said brake disc adjacent the bore thereof, said rings and said brake disc pieces having annular, complementary, interengaging bosses and grooves formed thereon to prevent relative lateral movement between said brake disc pieces and said semiannular ring portions, when said ring portions are fitted in one position on said brake disc pieces, said semiannular rings having apertures formed therein, which apertures register with said circumferentially spaced holes in said brake disc, when in one position, and bolts adapted to pass through the apertures in said semiannular rings and into said holes in said brake disc to detachably secure said brake disc pieces together.

References Cited

UNITED STATES PATENTS

| Re 24,870 | 9/1960 | Butler | 188—73 |
| 1,625,933 | 4/1927 | Bing | 192—107 |
| 2,655,229 | 10/1953 | Eksergian | 188—73 X |
| 2,657,772 | 11/1953 | Chamberlain | 188—73 X |
| 2,784,811 | 3/1957 | Butler | 188—73 |
| 2,902,130 | 9/1959 | Halberg et al. | 192—107 |
| 3,198,295 | 8/1965 | Fangman et al. | |

GEORGE E. A. HALVOSA, Primary Examiner

U.S. Cl. X.R.

188—18, 218, 250; 192—107